United States Patent
Huang

(10) Patent No.: US 10,268,869 B2
(45) Date of Patent: Apr. 23, 2019

(54) METHOD AND ELECTRICAL DEVICE FOR MERGING FINGERPRINT IMAGES

(71) Applicant: HIMAX TECHNOLOGIES LIMITED, Tainan (TW)

(72) Inventor: Tsung-Yau Huang, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 135 days.

(21) Appl. No.: 15/460,210

(22) Filed: Mar. 15, 2017

(65) Prior Publication Data
US 2018/0268192 A1 Sep. 20, 2018

(51) Int. Cl.
*G06K 9/00* (2006.01)

(52) U.S. Cl.
CPC ..... *G06K 9/00026* (2013.01); *G06K 9/00087* (2013.01)

(58) Field of Classification Search
CPC .................. G06K 9/00026; G06K 9/00087
See application file for complete search history.

(56) References Cited

U.S. PATENT DOCUMENTS

2012/0323859 A1* 12/2012 Yasa .................. G06F 16/1748
 707/692
2017/0200039 A1* 7/2017 Wright ............... G06K 9/00026

FOREIGN PATENT DOCUMENTS

CN 204256751 U 4/2015
TW 201411508 A 3/2014

* cited by examiner

*Primary Examiner* — Menatoallah Youssef
(74) *Attorney, Agent, or Firm* — CKC & Partners Co., LLC

(57) ABSTRACT

The method includes: setting up a hierarchy structure, wherein the hierarchy structure includes more than 2 levels, each slice in a lowest level of the levels is a single fingerprint image generated by a fingerprint sensor, a slice in a second level of the levels includes at most M slices in a first level of the levels, the second level is one level higher than the first level, and M is a positive integer greater than 1; obtaining a new fingerprint image, adding the new fingerprint image into the lowest level, arid updating the hierarchy structure; and outputting an enroll fingerprint image according to a slice in a highest level.

7 Claims, 8 Drawing Sheets

METHOD AND ELECTRICAL DEVICE FOR MERGING FINGERPRINT IMAGES

BACKGROUND

Field of Invention

The present invention relates to a method for merging fingerprint images. More particularly, the present invention relates to the method for merging fingerprint images based on a hierarchy structure.

Description of Related Art

Human fingerprints are detailed, nearly unique, difficult to alter, and durable over the life of an individual, making them suitable as long-term markers of human identity. There are at least two stages for the application of fingerprint. The first stage is enroll, and the second stage is verification or identification. In the enroll stage, a user puts his/her finger on a fingerprint sensor to scan enough fingerprint features. However, in some implementations, the area of the fingerprint sensor may not be large enough due to factors such as cost so that the finger has to be scanned several times, and thus an algorithm for merging multiple fingerprint images is needed. A conventional algorithm involves obtaining a first fingerprint image, and other follow-up fingerprint images are merged into the first fingerprint image. The defect of the algorithm is that when the first fingerprint image is not clear, the merged fingerprint image may have many errors, sometimes even causes error propagation. Therefore, it is an issue in the art about how to provide a better method for merging fingerprint images.

SUMMARY

Embodiments of the present invention provide a method for merging fingerprint images. The method includes: setting up a hierarchy structure, wherein the hierarchy structure includes multiple levels, a number of the levels is greater than 2, each slice in a lowest level of the levels is a single fingerprint image generated by a fingerprint sensor, a slice in a second level of the levels includes at most M slices in a first level of the levels, the second level is one level higher than the first level, and M is a positive integer greater than 1; obtaining a new fingerprint image, adding the new fingerprint image into the lowest level, and updating the hierarchy structure; and outputting an enroll fingerprint image according to a slice in a highest level of the levels.

In some embodiments, the method further comprises: setting the each slice in the lowest level as complete; and setting a slice in a $i^{th}$ level of the levels as complete if the slice in the $i^{th}$ level includes M complete slices in a $(i-1)^{th}$ level of the levels, wherein i is a positive integer greater than 1.

In some embodiments, the method further comprises: setting a $L^{th}$ level of the levels as the lowest level, and setting the new fingerprint image as an incoming slice, wherein L is a positive integer; trying merging the incoming slice into an incomplete slice in a $(L+1)^{th}$ level to generate a first slice in the $(L+1)^{th}$ level; and searching for a complete slice in the $L^{th}$ level to merge into the first slice if the step of trying merging the incoming slice into the incomplete slice in the $(L+1)^{th}$ level succeeds and the first slice is incomplete.

In some embodiments, the method further comprises: trying merging the incoming slice into a complete slice in the $L^{th}$ level to generate a second slice in the $(L+1)^{th}$ level if the step of trying merging the incoming slice into the incomplete slice in the $(L+1)^{th}$ level fails; and searching for another complete slice in the $L^{th}$ level to merge into the second slice if the step of trying merging the incoming slice into the complete slice in the $L^{th}$ level succeeds and the second slice is incomplete.

In some embodiments, the method further comprises: determining whether any slice is transformed from incomplete into complete if the step of trying merging the incoming slice into the incomplete slice in the $(L+1)^{th}$ level succeeds or the step of trying merging the incoming slice into the complete slice in the $L^{th}$ level succeeds; if a third slice is transformed from incomplete into complete, setting L=L+1, and setting the third slice as the incoming slice; and repeating the step of trying merging the incoming slice into the incomplete slice in the $(L+1)^{th}$ level.

In some embodiments, the method further comprises: determining whether to output the enroll fingerprint image if the step of trying merging the incoming slice into the complete slice in the $L^{th}$ level fails or no slice is transformed from incomplete into complete; and waiting for another new fingerprint image if determining that not outputting the enroll fingerprint image.

In some embodiments, the method further comprises: obtaining a largest slice in the highest level, and trying merging all slices in the hierarchy structure into the largest slice; determining whether a number of fingerprint images included by the largest slice is greater than a predetermined number; and outputting the largest slice as the enroll fingerprint image if the number of the fingerprint images included by the largest slice is greater than the predetermined number.

From another aspect, embodiments of the present invention provide an electrical device including a fingerprint sensor and a computing circuit. The fingerprint sensor obtains a new fingerprint image. The computing circuit is coupled to the fingerprint sensor and set up a hierarchy structure. The hierarchy structure includes multiple levels. The number of the levels is greater than 2. Each slice in a lowest level of the levels is a single fingerprint image generated by the fingerprint sensor. A slice in a second level of the levels includes at most M slices in a first level of the levels. The second level is one level higher than the first level, and M is a positive integer greater than 1. The computing circuit adds the new fingerprint image into the lowest level, updates the hierarchy structure, and outputs an enroll fingerprint image according to a slice in a highest level of the levels.

In some embodiments, the computing circuit further performs the steps of the method described above.

BRIEF DESCRIPTION OF THE DRAWINGS

The invention can be more fully understood by reading the following detailed description of the embodiment with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

The using of "first", "second", "third", etc. in the specification should be understood for identifying units or data described by the same terminology, but are not referred to particular order or sequence. In addition, the term "couple" used in the specification should be understood for electrically connecting two units directly or indirectly. In other words, when "a first object is coupled to a second object" is written in the specification, it means another object may be disposed between the first object and the second object.

Figure 1:
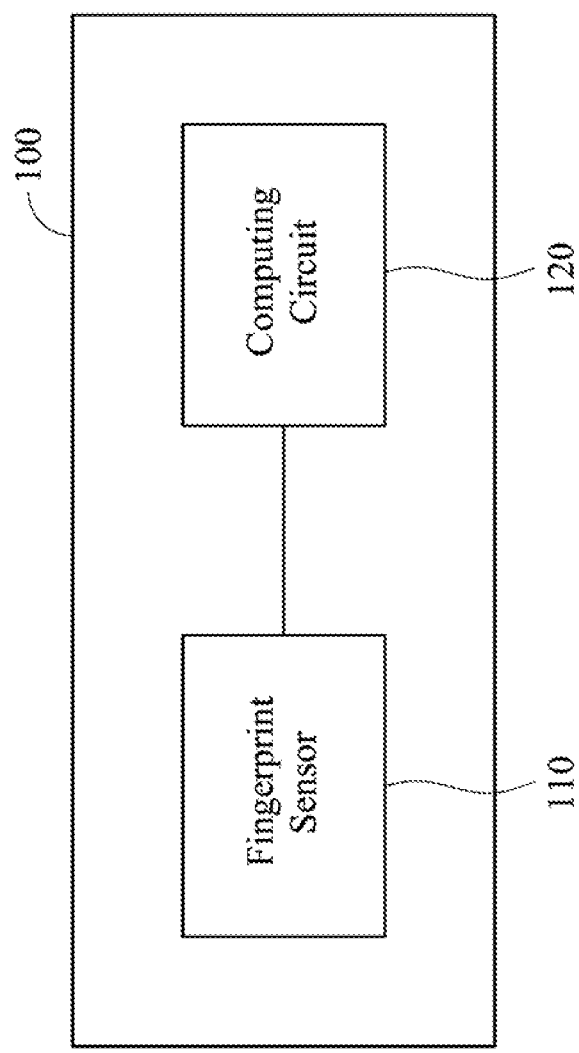
FIG. 1 is a schematic diagram illustrating an electrical device according to an embodiment.

FIG. 1 is a schematic diagram illustrating an electrical device according to an embodiment. Referring to FIG. 1, an electrical device 100 includes a fingerprint sensor 110 and a computing circuit 120. The electrical device 100 may be smart phone, tablet, music player, laptop, industry computer, or any other forms of electrical device, which is not limited in the invention. The fingerprint sensor 110 is configured to obtain human fingerprint image. The sensing mechanism of the fingerprint sensor 110 may be optical, capacitive, ultrasonic, or the like, and the sensing mechanism of the fingerprint sensor 110 is not limited in the invention. The computing circuit 120 may be central processing unit, microprocessor, microcontroller, digital signal processor, baseband processor, image processing chip, application-specific integrated circuit (ASIC) or the like.

Figure 2:
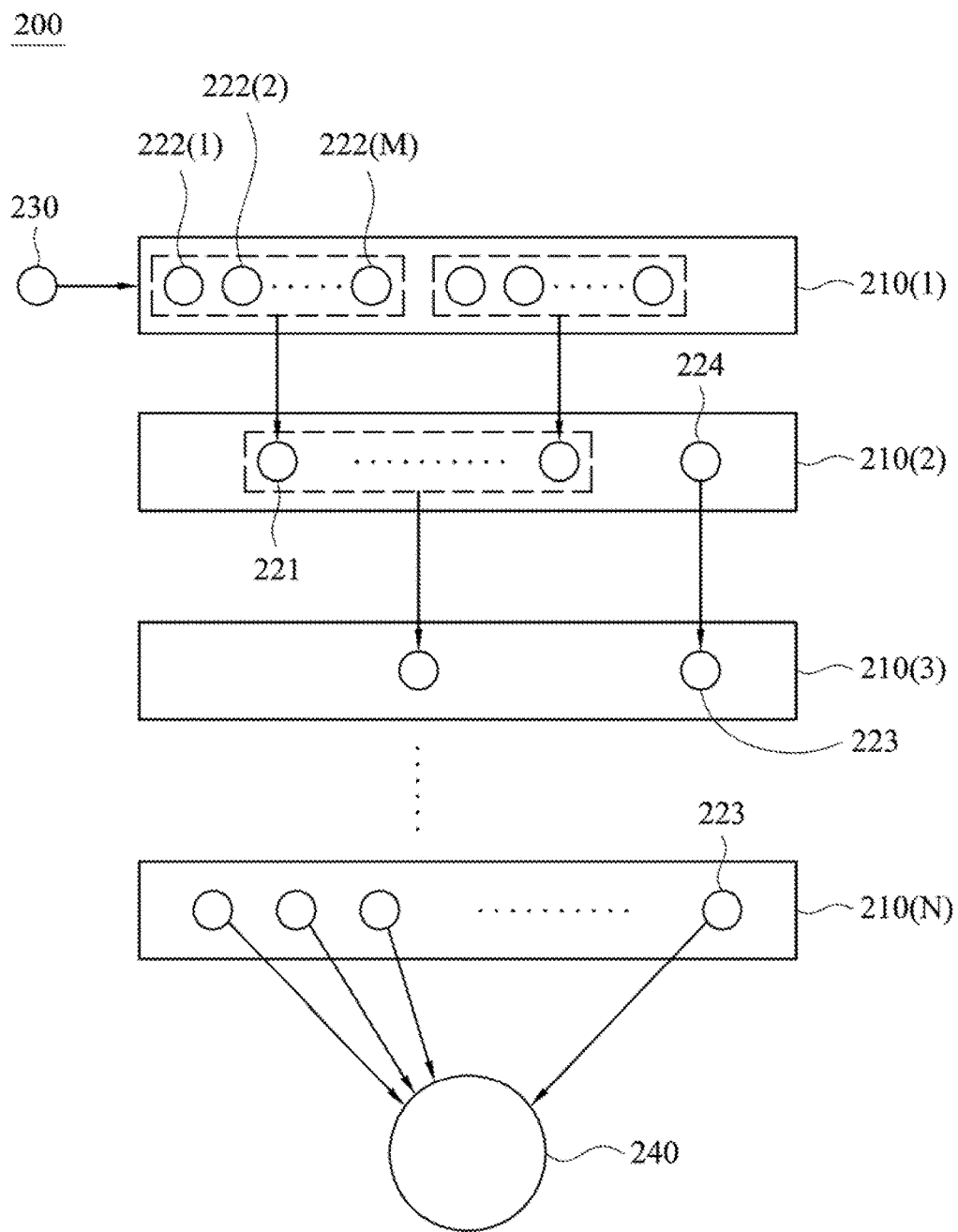
FIG. 2 is a diagram illustrating a hierarchy structure according to an embodiment.

The fingerprint sensor 110 obtains multiple fingerprint images, and sends the obtained fingerprint images to the computing circuit 120 which would merge these fingerprint images. FIG. 2 is a diagram illustrating a hierarchy structure according to an embodiment. Referring to FIG. 2, the computing circuit 120 set up a hierarchy structure 200 including N levels 210(1)-210(N), where N is a positive integer greater than 2. The level 210(1) is the lowest level, and the level 210(N) is the highest level. Herein "slice" is defined as a unit in the slices. A slice in the level 210(2) includes at most M slices in the level 210(1), where M is a positive integer greater than 1. A slice in the level 210(3) includes at most M slices in the level 210(2), and so on. In other words, if the hierarchy structure 200 has a first level and a second level, and the second level is one level higher than the first level, then one slice in the second level includes at most M slices in the first level.

Every slice may be complete or incomplete. First of all, each slice in the lowest level 210(1) is a single fingerprint image generated by the fingerprint sensor 110, and each slice in the lowest level 210(1) is complete. In addition, if a slice in an $i^{th}$ level includes M complete slices in an $(i-1)^{th}$ level, the slice in the $i^{th}$ level is set to be complete (otherwise incomplete), where i is a positive integer greater than 1. For example, a slice 221 in the level 210(2) includes M slices 222(1)-222(M) in the level 210(1), and therefore the slice 221 is complete. A slice 223 in the level 210(3) includes only one slice 224 in the level 210(2), and therefore the slice 223 is incomplete. From another perspective, M complete slices in the $(i-1)^{th}$ level may be merged as one complete slice in the $i^{th}$ level. Slices in the highest level 210(N) are used to output an enroll fingerprint image 240. That is, the enroll fingerprint image 240 has enough area or features to perform an enroll process. When the fingerprint sensor 110 obtains a new fingerprint image 230, the new fingerprint image 230 is added into the lowest level 210(1), and then the computing circuit 120 updates the hierarchy structure 200. The process of updating will be described below.

Figure 3:
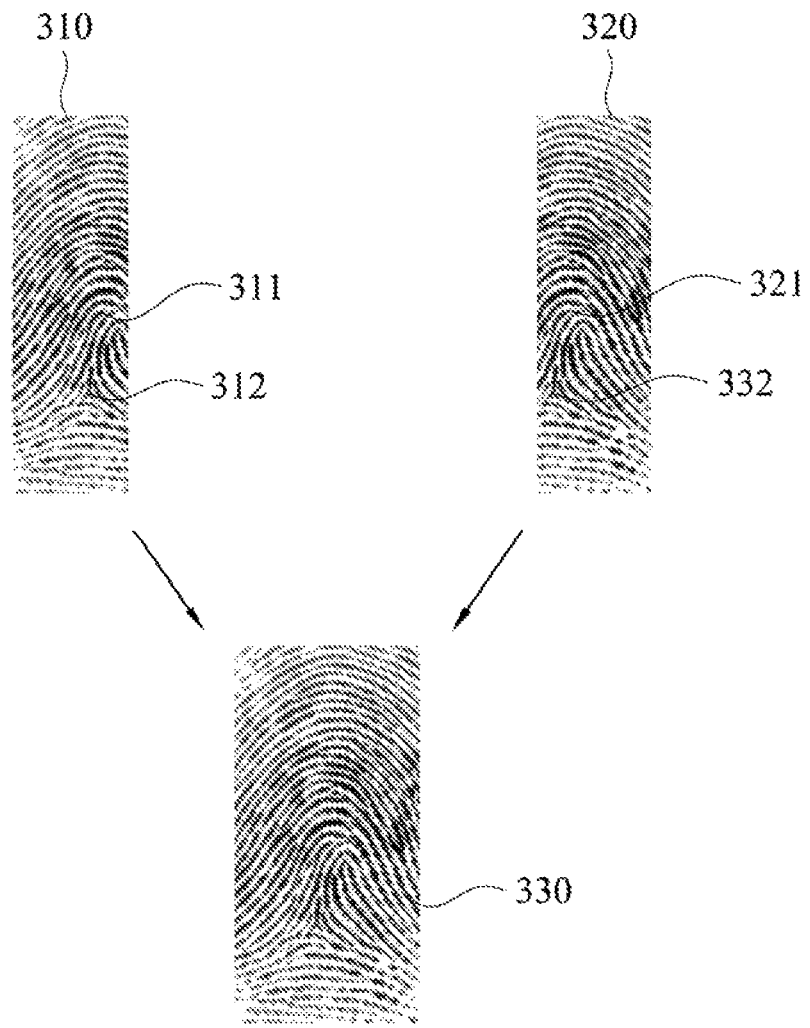
FIG. 3 is a diagram illustrating merging two slides according to an embodiment.

Merging of two slices is described herein. FIG. 3 is a diagram illustrating merging two slices according to an embodiment. Referring to FIG. 3, assume a fingerprint image 310 and a fingerprint image 320 are two slices respectively. Lines in the fingerprint images are called "ridge", and the spaces between ridges are "valleys". Neither fingerprint image 310 nor fingerprint image 320 is enroll fingerprint image. That is, the areas of the fingerprint images 310 and 320 are not large enough. Features may be extracted from the fingerprint image 310 and 320. In general, the extracted features may include ridge ending and ridge bifurcation. For example, the fingerprint image 310 has an ending 311 and a bifurcation 312, and the fingerprint image 320 has an ending 321 and a bifurcation 322. The features in the fingerprint image 310 are matched to the features in the fingerprint image 320. For example, the ending 311 is matched to the ending 321, and the bifurcation 312 is matched to the bifurcation 322. After matching the features, the fingerprint images 310 and 320 are merged as a fingerprint image 330. However, if there is no matched features or the number of the matched features is not enough, it means the fingerprint image 310 cannot be merged into the fingerprint image 320. The merging is just an example, and what features are extracted, and how to merge two fingerprint images (i.e. slices) are not limited in the invention.

Figure 4:
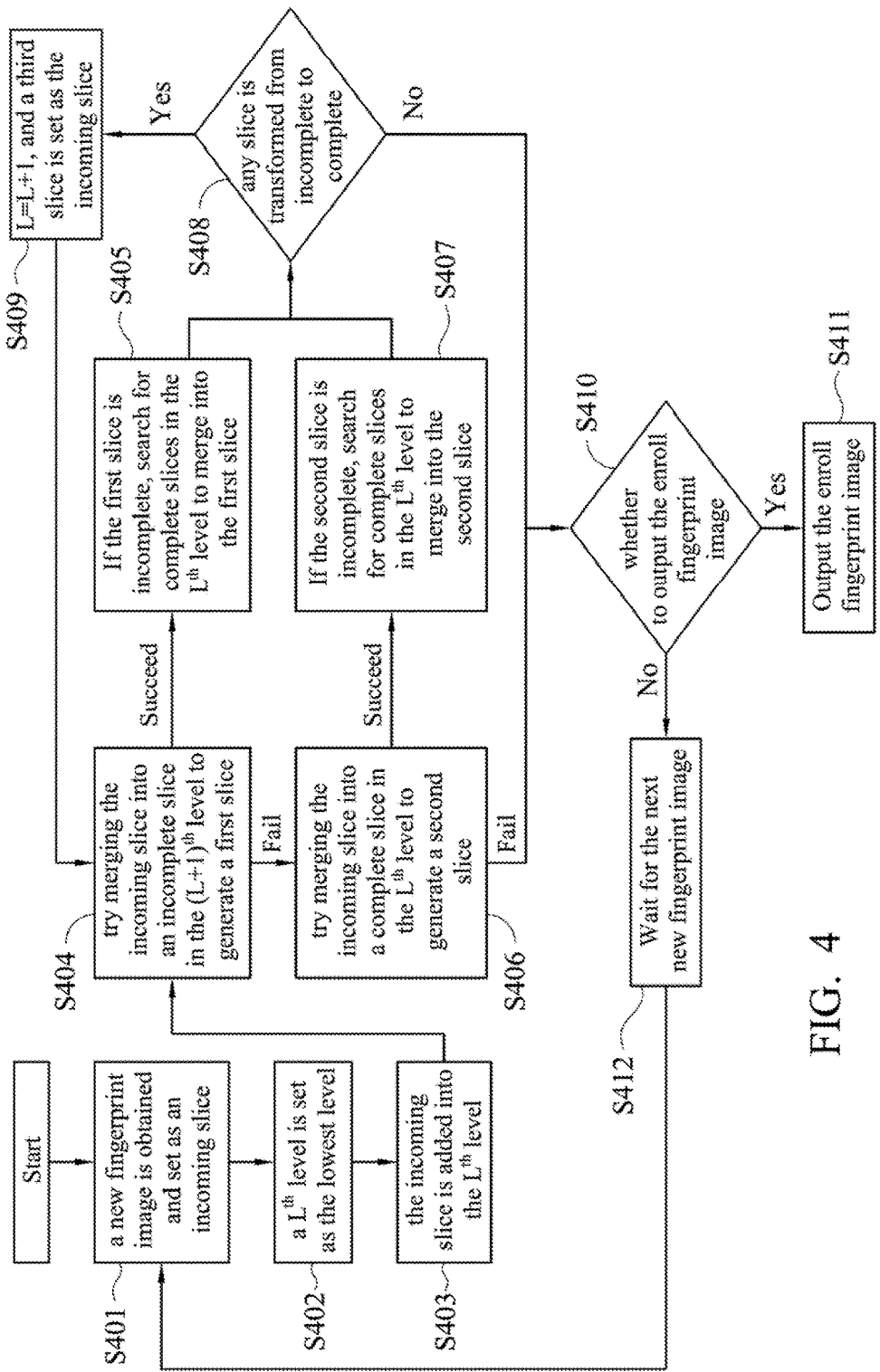
FIG. 4 is a diagram illustrating a flow chart of updating the hierarchy structure.
Figure 5:
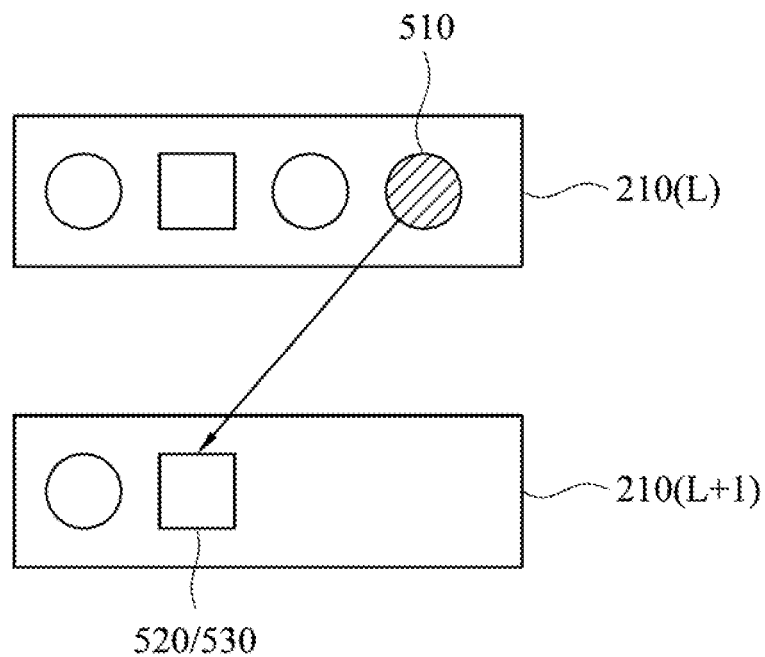
FIG. 5 to FIG. 9 are diagrams illustrating steps of updating of the hierarchy structure.

In the embodiment, two complete slices in the same level can be merged, but an incomplete slice cannot be merged into another slice in the same level; when the merging across different levels, the slice in the lower level has to be complete. The merging criteria will be explained in detail with reference of FIG. 4. FIG. 4 is a diagram illustrating a flow chart of updating the hierarchy structure. Each step in FIG. 4 is performed by the computing circuit 120. Referring to FIG. 4, in step S401, a new fingerprint image is obtained from the fingerprint sensor 110, and the new fingerprint image is set as an incoming slice. In step S402, a $L^{th}$ level is set as the lowest level, where L is a positive integer. L is set as 1 in the embodiment. In step S403, the incoming slice is added into the $L^{th}$ level. Referring to FIG. 4 and FIG. 5 together, a slice 510 is the incoming slice. The circles in the levels are complete slices, and the squares are incomplete slices. The positive integer M is greater than 2. When the incoming slice 510 is the new fingerprint image, the level 210(L) is the level 210(1), and every slice in the level 210(1) is complete. However, for generalization, the level 210(L) is used in FIG. 5, and the level 210(L) has an incomplete slice.

In step S404, the computing circuit 120 tries merging the incoming slice 510 into an incomplete slice in the $(L+1)^{th}$ level to generate a first slice. For example, the computing circuit 120 may try merging the incoming slice 510 into an incomplete slice 520 in the level 210(L+1). In some embodiment, if there are more than one incomplete slice in the level 210(L+1), the older slice (i.e. the slice staying in the level 210(L+1) longer than others) may be selected first, and then the other slices in the level 210(L+1) are tried. If the step of merging the incoming slice 510 into the incomplete slice 520 succeeds, a new slice is generated, and herein is referred to a first slice 530.

If the step S404 succeeds, then step S405 is performed, in which whether the first slice 530 is incomplete is determined. If the first slice 530 is incomplete, the computing circuit 120 searches for complete slices in the $L^{th}$ level to merge into the first slice 530. For example, referring to FIG.

6, because the first slice 530 is incomplete, the computing circuit 120 tries merging the slices 610 and 620 into the first slice 530. In the embodiment the level 210(L) has two complete slices 610 and 620, and therefore an older one (i.e. slice 610) is selected first to merge into the first slice 530. The step S405 is repeated until the first slice 530 is complete or the level 210(L) has no complete slice. It is worth mentioning that although the level 210(L) has a slice 630, the computing circuit 120 does not try merging the slice 630 into the first slice 530 because the slice 630 is incomplete. A level 210(L−1) is responsible for the slice 630, and that is, the slice 630 may turn into complete when dealing with the level 210(L−1).

Figure 6:
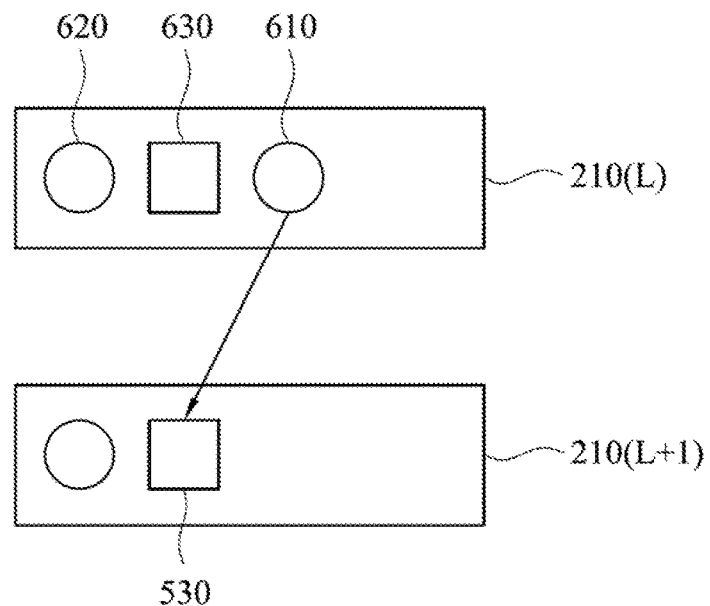

The aforementioned positive integer M is greater than 2 in the examples of FIG. 5 and FIG. 6. When the positive integer M is equal to 2, the level 210(L+1) does not have any incomplete slice (the reason will be described below), and therefore the step S404 will fail and the step S405 will not be executed.

On the other hand, if the step S404 fails, the computing circuit 120 tries merging the incoming slice into a complete slice in the $L^{th}$ level to generate a second slice in the $(L+1)^{th}$ level in step S406. For example, referring to FIG. 4 and FIG. 7, the computing circuit 120 may try merging the incoming slice 510 into a complete slice 710 in the same level 210(L) to generate a second slice 720 in the level 210(L+1). The positive integer M is greater than 2 in the embodiment, and therefore the second slice 720 should be incomplete. In addition, if the level 210(L) has more than one complete slices 710 and 730 except for the incoming slice 510, the older slice (i.e. the complete slice 710) is first elected to try the merging. If the incoming slice 510 cannot be merged with the slice 710, then the merging of the incoming slice 510 and the slice 730 is tried.

If the step S406 succeeds, whether the second slice 720 is incomplete is determined in step S407. If the second slice 720 is incomplete, complete slices in the $L^{th}$ level are searched to merge into the second slice 720. For example, referring to FIG. 4 and FIG. 8, because the second slice 720 is incomplete, the complete slice 730 is searched in the level 210(L) to merge into the second slice 720. If the slice 730 cannot be merged into the second slice 720, then the second slice 720 is maintained unchanged.

Figure 7:
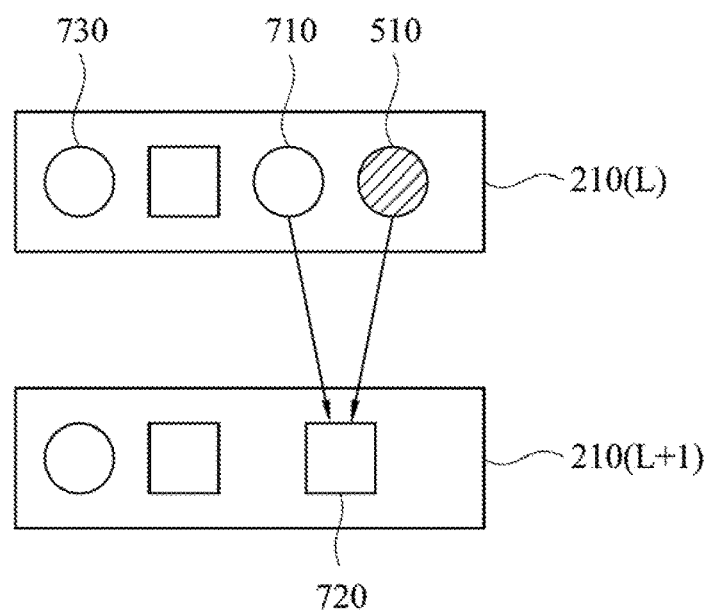
Figure 8:
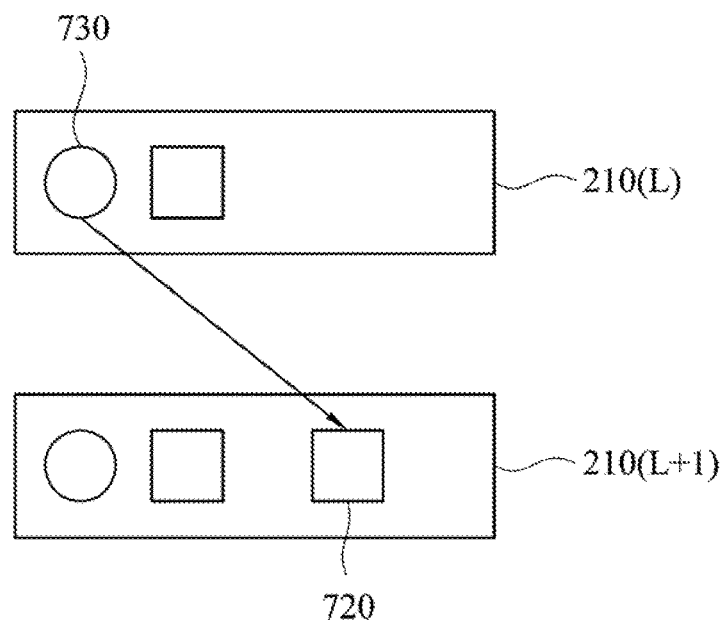
Figure 9:
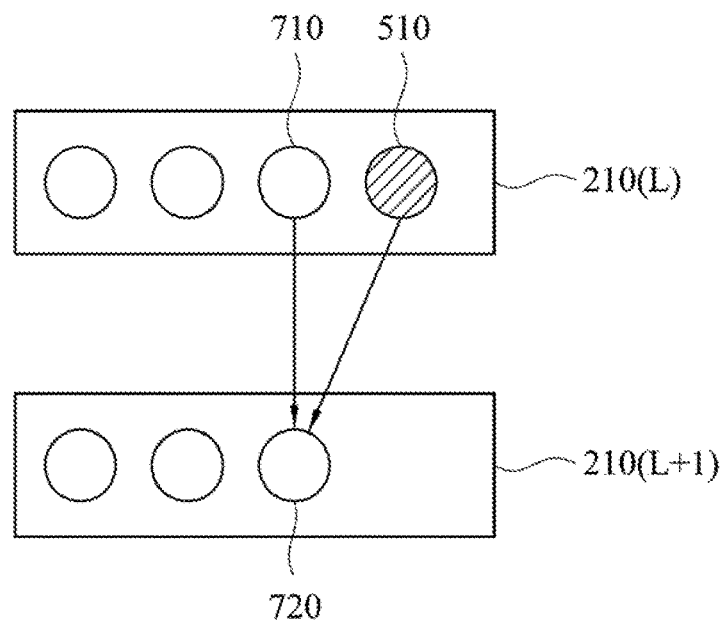

It is worth mentioning that, the positive integer M is greater than 2 in the embodiments of FIG. 7 and FIG. 8. However, if the positive integer M is equal to 2, the all generated slice is complete. For example, referring to FIG. 9, after merging the incoming slice 510 with the slice 710, the generated second slice 720 is complete. Further, if the positive integer M is equal to 2, then all slices in all levels are complete.

Referring to FIG. 4, step S408 is performed after the step S405 or the step S407, in which whether any slice is transformed from incomplete to complete is determined. In the embodiment, whether the updated first slice 530 in FIG. 6 is complete is determined or whether the generated second slice 720 is complete is determined. If a third slice (i.e. the first slice 530 or the second slice 720) is transformed from incomplete to complete, then step S409 is performed, in which L=L+1, and the third slice is set as the incoming slice. Next, the step S404 is performed again according to the updated incoming slice. From another aspect, if the result of the step S408 is "yes", it means a new complete slice is generated in the $(L+1)^{th}$ level, and the new complete slice may be able to be merged into the next level. If the result of the step S408 is "no", it means even a new slice is generated in the $(L+1)^{th}$ level, the new slice is no way merged into the next level because the new slice is incomplete, and thus it does not need to perform the step S409 again.

On the other hand, when the positive integer M is equal to 2, the step S405 is not performed, and the second slice generated in the step S406 must be complete, and therefore the result of the step S408 must be "yes".

If the step S406 fails or the result of the step S408 is "no", then step S410 is performed, in which whether to output the enroll fingerprint image is determined. Referring to FIG. 2 again, in some embodiments, a largest slice is obtained from the highest level 210(N). The largest slice may be the fingerprint image having the largest area or the fingerprint image having most single fingerprint images. After the largest slice is obtained, the computing circuit 120 tries merging all slices in the hierarchy structure 200 into the largest slice. Next, the computing circuit 120 determines whether the number of the fingerprint images included in the largest slice is greater than a predetermined number. If the number of the fingerprint images included in the largest slice is greater than the predetermined number, the result of the step S410 is "yes", and then the largest slice is outputted as the enroll fingerprint image in step S411. However, the invention is not limited thereto, in other embodiments, after trying merging all the slices in the hierarchy structure 200 into the largest slice, the computing circuit 120 may determine whether the area of the largest slice is greater than a predetermined area or determine whether the number of the features in the largest slice is greater than a predetermined number so as to determine whether to output the enroll fingerprint image. Alternatively, if the fingerprint sensor 110 has obtained more than a predetermined number of fingerprint images, then the result of the step S410 may be determined to be "yes". The content of the step S410 is not limited in the invention.

If the result of the step S410 is "no", then in step S412, the computing circuit 120 waits for the next new fingerprint image (obtained in step S401).

Figure 10:
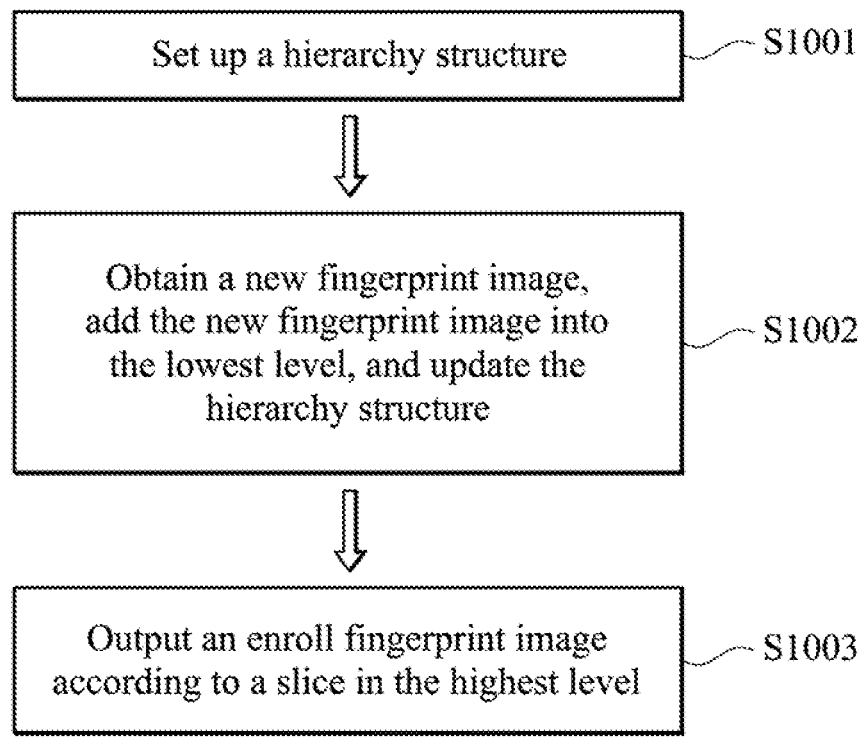
FIG. 10 is a diagram illustrating a flow chart of a meth for merging fingerprint images.

FIG. 10 is a diagram illustrating a flow chart of a meth for merging fingerprint images. Referring to FIG. 10, in step S1001, a hierarchy structure is set up. The hierarchy structure includes more than 2 levels. Each slice in the lowest level is a single fingerprint image obtained by the fingerprint sensor. When a second level is one level higher than a first level, one slice in the second level includes at most M slices in the first level. In step S1002, a new fingerprint image is obtained, the new fingerprint image is added into the lowest level, and the hierarchy structure is updated. In step S1003, an enroll fingerprint image is outputted according to a slice in the highest level. However, each step in FIG. 10 is described in detail above, and therefore the description will not be repeated again. Note that each step in FIG. 10 may be implemented as programs or circuits, which is not limited in the invention. In addition, the method of FIG. 10 may be performed independently, or performed with the embodiments discussed above. In other words, other steps may be inserted between the steps of FIG. 10. And, the steps of FIG. 10 may be repeated (e.g. the step S1002).

In the method provided in the embodiments of the invention, the error propagation will not happen. Even errors are produced, the errors are uniform. In addition, the accuracy rate of the verification process is increased by using the enroll fingerprint image generated by the method.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An electrical device, comprising:
    a fingerprint sensor, obtaining a new fingerprint image; and
    a computing circuit, coupled to the fingerprint sensor and setting up a hierarchy structure, wherein the hierarchy structure comprises a plurality of levels, a number of the levels is greater than 2, each slice in a lowest level of the levels is a single fingerprint image generated by the fingerprint sensor, a slice in a second level of the levels comprises at most M slices in a first level of the levels, the second level is one level higher than the first level, and M is a positive integer greater than 1,
    wherein the computing circuit adds the new fingerprint image into the lowest level, updates the hierarchy structure, and outputs an enroll fingerprint image according to a slice in a highest level of the levels.

2. The electrical device of claim 1, wherein the computing circuit further performs steps of:
    setting the each slice in the lowest level as complete; and
    setting a slice in a $i^{th}$ level of the levels as complete if the slice in the $i^{th}$ level comprises M complete slices in a $(i-1)^{th}$ level of the levels, wherein i is a positive integer greater than 1.

3. The electrical device of claim 2, wherein the computing circuit further performs steps of:
    setting a $L^{th}$ level of the levels as the lowest level, and setting the new fingerprint image as an incoming slice, wherein L is a positive integer;
    trying to merge the incoming slice into an incomplete slice in a $(L+1)^{th}$ level to generate a first slice in the $(L+1)^{th}$ level; and
    searching for a complete slice in the $L^{th}$ level to merge into the first slice if the step of trying to merge the incoming slice into the incomplete slice in the $(L+1)^{th}$ level succeeds and the first slice is incomplete.

4. The electrical device of claim 3, wherein the computing circuit further performs steps of:
    trying to merge the incoming slice into a complete slice in the $L^{th}$ level to generate a second slice in the $(L+1)^{th}$ level if the step of trying to merge the incoming slice into the incomplete slice in the $(L+1)^{th}$ level fails; and
    searching for another complete slice in the $L^{th}$ level to merge into the second slice if the step of trying to merge the incoming slice into the complete slice in the $L^{th}$ level succeeds and the second slice is incomplete.

5. The electrical device of claim 4, wherein the computing circuit further performs steps of:
    determining whether any slice is transformed from incomplete into complete if the step of trying to merge the incoming slice into the incomplete slice in the $(L+1)^{th}$ level succeeds or the step of trying to merge the incoming slice into the complete slice in the $L^{th}$ level succeeds;
    if a third slice is transformed from incomplete into complete, setting L=L+1, and setting the third slice as the incoming slice; and
    repeating the step of trying to merge the incoming slice into the incomplete slice in the $(L+1)^{th}$ level.

6. The electrical device of claim 5, wherein the computing circuit further performs steps of:
    determining whether to output the enroll fingerprint image if the step of trying to merge the incoming slice into the complete slice in the $L^{th}$ level fails or no slice is transformed from incomplete into complete; and
    waiting for another new fingerprint image if determining that not outputting the enroll fingerprint image.

7. The electrical device of claim 6, wherein the computing circuit further performs steps of:
    obtaining a largest slice in the highest level, and trying to merge all slices in the hierarchy structure into the largest slice;
    determining whether a number of fingerprint images included by the largest slice is greater than a predetermined number; and
    outputting the largest slice as the enroll fingerprint image if the number of the fingerprint images included by the largest slice is greater than the predetermined number.

* * * * *